Patented Jan. 9, 1951

2,537,020

UNITED STATES PATENT OFFICE 2,537,020

PROCESS OF PREPARING MALEIC ANHYDRIDE INTERPOLYMERS

Gerald R. Barrett, Winchester, Mass., assignor to Monsanto Chemical Company, St. Louis, Mo., a corporation of Delaware No Drawing. Application March 30, 1949, Serial No. 84,470

11 Claims. (Cl. 260—78.5)

1

The present invention relates to artificial resins and a process of preparing them.

More particularly, the present invention relates to the preparation of resinous compositions by reacting or copolymerizing polymerizable vinyl compounds possessing the structural formula of R—CH=CH$_2$ where R is a phenyl or substituted phenyl radical with ethylene $\alpha,\beta$ dicarboxylic acid compounds.

It is known to prepare compounds of the above class by reacting, for example, styrene, with maleic anhydride to give resinous products. However, the processes heretofore employed in the manufacture of such products generally leave much to be desired. More particularly, the processes heretofore employed do not lend themselves to the control of the reaction rate and the control of the molecular weight of the polymer obtained. The control of reaction rate and molecular weight of the copolymer is, in particular, difficult in the so-called "mass" polymerization process, that is, a process where no solvent or substantially no solvent for the reacting ingredients is employed. In such "mass" polymerization processes where the originally fluid monomer converts essentially completely to a mass of solid polymer, there is an extremely difficult problem presented of removing the heat of reaction from a system so viscous to solid after the first stages of reaction that heat is removed largely only by conduction. Further, in such so-called "mass" polymerization processes, great difficulty is experienced due to the separation of the polymer as a gel from the polymer-monomer mixture. Such separation of the polymer from the polymer-monomer mixture is highly undesirable for a number of reasons, one of which is that it renders control of the reaction more difficult. Another reason is that, for example, in the styrene-maleic anhydride polymerization process, the separated polymer tends to be swollen with an excess of maleic anhydride which persists in the final polymer as unpolymerized material. Concurrently, the styrene-rich residual monomer may result in either a styrene-rich polymer of unsatisfactory alkali solubility or persists as monomeric styrene impurity in the product.

An object of this invention is then to provide a new process for the manufacture of reaction products or copolymers of compounds possessing the structural formula of R—CH=CH$_2$ where R is a phenyl or substituted phenyl radical with ethylene $\alpha,\beta$ dicarboxylic acid compounds.

Another object is to provide an improved process for the "mass" polymerization of such compounds, in which gel formation is substantially avoided.

2

A further object is to provide an improved process for the control of the molecular weight and viscosity characteristics of such polymers.

A further object of this invention is to provide a copolymerization product having improved properties. Other objects will be apparent as herein disclosed.

This invention is carried out, in general, by first heating a mixture of the polymerizable vinyl compound such as styrene monomer and an ethylene $\alpha,\beta$ dicarboxylic acid anhydride such as maleic anhydride in the presence of certain proportions as described hereinafter of an alkyl half ester of an ethylene $\alpha,\beta$ dicarboxylic acid, in which the alkyl group contains from 1 to 3 carbon atoms, until the polymerization reaction is initiated. The half ester is added to the mixture prior to or during the heating. The polymerization reaction is highly exothermic once initiated and the polymerization mass should be cooled sufficiently to keep the reaction under control. The reaction mixture is preferably heated again after the exothermic reaction has run its course or near the end of the exothermic reaction to complete the reaction of the remaining monomers.

The above described process is preferably carried out by employing about 1 molecular proportion of the dicarboxylic components, including the acid anhydride and the half ester, together with about 1 to 1.2 molecular proportions of the polymerizable vinyl compound. If larger proportions of the vinyl compound, for example styrene, are employed, the copolymer is more apt to separate as a gel from the reaction mass. However, it is possible to employ as much as 1.5 molecular proportions of the vinyl compound to 1 molecular proportion of dicarboxylic components by increasing the proportion of the half ester in the dicarboxylic components. If larger proportions of dicarboxylic components are employed, the copolymer often contains undesirable quantities of unreacted dicarboxylic components.

The dicarboxylic components are present in the reacting mass in a ratio of at least 0.1 molecular proportion of the half ester, for example methyl half ester of maleic acid, to 1 molecular proportion of the acid anhydride, for example maleic anhydride. By so doing it is possible to substantially prevent gel formation. It is preferred, however, to use higher ratios of the half ester to the acid anhydride. By increasing the molecular proportion of half ester and decreasing the molecular proportion of the acid anhydride proportionately, it is possible to further reduce the reaction rate and to further minimize the separation of the resulting copolymer as a gel. It is also possible to produce copolymers having lower molecular weights and lower viscosities in organic solvents. There is a practical limit, however, on the amount of the half ester which can be used to replace the acid anhydride since the copolymer should not differ materially in its properties or in its uses from that prepared solely from the vinyl compound and the acid anhydride. It is preferred to have the dicarboxylic components present in the polymerization mass in ratios of 1 molecular proportion of acid anhydride to 0.20 to 1.5 molecular proportions of the half ester.

The polymerization reaction is carried out either in the presence or absence of a polymerization catalyst. The use of a polymerization catalyst in the processes of this invention is not essential and is sometimes detrimental especially if the reaction rate is thereby unduly increased. However, catalysts are helpful in carrying the reaction to completion in a shorter period of time. A large variety of polymerization catalysts are useable in the processes of this invention including, generally, the dialkyl disulfides, diazo compounds, perbenzoates and dialkyl peroxides. As examples of such catalysts may be mentioned diamyl disulfide, ditertiary dodecyl disulfide and the like; diazo amino benzene and the like, tertiary butyl perbenzoate and the like; and ditertiary butyl peroxide, ditertiary amyl peroxide, diethyl peroxide and the like. When catalysts are used, it is preferred to employ small amounts thereof, for example, from 0.02 to 0.1% by weight, based on the weight of the reaction mass.

The polymerization reaction is carried out either in the presence of air or in an atmosphere of inert gas such as carbon dioxide, nitrogen, helium, argon etc. It is preferred, however, to carry out the reaction in an atmosphere of inert gas and to replace a substantial amount of the entrapped air in the monomers with such inert gas prior to initiating the polymerization reaction by heating. The reason for this is that air tends to inhibit the initiation of the polymerization reaction and thus often makes it necessary to heat the monomer mixture to higher temperatures than are normally required in an inert atmosphere with the attendant danger of an uncontrollable reaction when the exothermic polymerization reaction begins.

In most instances the polymerization reaction can be successfully initiated depending upon the purity of the monomers and the quantity of air or other inhibitors present in the monomer mixture by heating the mixture at temperatures between 40° and 70° C. for periods of 15 to 45 minutes. If higher temperatures are used the time may be shortened, but then there is a danger of uncontrollable reactions. If the monomer mixture is heated at lower temperatures a longer time is generally required to initiate the reaction. These conditions will vary to some extent depending upon additional factors such as the size of the batch and the type of reactor used and are merely illustrative and not critical.

After the polymerization reaction is initiated heat is generated because of the exothermic nature of the reaction. If heating is continued and heat is not removed from the reacting mass, the reaction soon becomes uncontrollable and results in a product which is substantially non-uniform in composition and molecular weight. For this reason heating is discontinued after the exothermic polymerization reaction is initiated. The reacting mass generates sufficient heat to continue the reaction and the mass is preferably only cooled sufficiently to keep the reaction under control. It is at this stage of the reaction that the presence of the half ester is beneficial in that it reduces the reaction rate and thus enables the use of higher temperatures during the reaction, and also increases the solubility of the copolymer in the monomer mixture. It is the use of such higher temperatures and this increased solubility which enables the reaction to be carried out without appreciable separation of the copolymer as a gel. The greater the proportion of half ester used the greater the solubility of the copolymer in the monomer mix and the higher the temperature it is possible to use. By using the molar ratios of half ester to acid anhydride described previously, it is possible to reduce the reaction rate and to maintain the reaction mass at temperatures as high as 30° to 60° C. by cooling, without appreciable separation of the copolymer as a gel. At these temperatures the duration of the exothermic reaction is largely dependent on the size of the batch and varies, in general, between about 2 hours and 30 hours. The exothermic reaction is suitably controlled, for example, by regulating the temperature so that from 3 to 5% of the monomers react in a 1 hour period.

The polymerization reaction is preferably completed by heating the mass near the end of the exothermic reaction or after the exothermic reaction is completed. The reaction mass is generally heated to temperatures between 120° to 170° C. to complete the reaction although these temperatures are not critical. The duration of this phase of the reaction varies depending upon the presence or absence of polymerization catalysts in the reacting mass. Generally speaking, it is possible to complete the reaction within a period of 1 to 3 hours when a polymerization catalyst is employed, and longer periods are generally required when no catalyst is present.

A further understanding of the present invention will be obtained from the following specific examples which are intended to be illustrative, but not limitative of the present invention, parts and percentages being by weight.

*Example I*

A mixture of methyl half ester of maleic acid and maleic anhydride was first prepared as follows:

Forty-five parts of maleic anhydride were reacted with 5 parts of methanol by heating at a temperature of 65° C. for 30 minutes. A conversion of substantially 100% of the methanol to the methyl acid ester of maleic acid was thus effected.

The above mixture was stirred together with 50 parts of monomeric styrene and the resulting mass was heated in an inert atmosphere of carbon dioxide at a temperature of 50° C. until the polymerization reaction was initiated as indicated by a rise in temperature and increased viscosity, which required about 30 minutes. The reaction temperature was then lowered to 30° C., by cooling, for several hours until the initially vigorous reaction abated. The temperature of the reaction mass was then gradually raised over a period of 2 hours to 130° to 135° C. and was held at this temperature for a period of 2 hours. The resulting copolymer had a low residual monomer content and was soluble, after comminution, in aqueous solutions of alkaline materials such as ammonia, caustic soda and the like.

Example II

A mixture of ethyl half ester of maleic acid and maleic anhydride was first prepared as follows:

Forty-five parts of maleic anhydride were reacted with 5 parts of 99 to 100% ethanol by heating to a temperature of 80° C. for about 40 minutes. A conversion of substantially 100% of the ethanol to ethyl half ester of maleic acid was thus effected.

The resulting mixture was then polymerized with 50 parts of monomeric styrene according to the procedure described in Example I.

The resulting copolymer had a low residual monomer content and was soluble, after comminution, in aqueous solutions of ammonia and alkali metal hydroxides such as sodium hydroxide.

Example III

A mixture of propyl half ester of maleic acid and maleic anhydride was first prepared as follows:

Forty-four parts of maleic anhydride were reacted with 6 parts of n-propanol by heating at a temperature of 90° C. for 20 minutes. Substantially all of the n-propanol was thus converted to the n-propyl half ester of maleic acid.

The resulting mixture was then stirred together with 50 parts of monomeric styrene and the mass was heated in an inert atmosphere of nitrogen at a temperature of 50° C. until the polymerization reaction was initiated, which required about 40 minutes. The temperature of the reacting mass was then lowered to about 30° C., by cooling, during the period of initially vigorous reaction. The vigorous reaction abated within several hours, and the temperature of the mass was then gradually raised over a period of 2 hours to about 135° C. The mass was held at this temperature for two hours to complete the reaction. A copolymer having low residual monomer content was thus obtained. The copolymer, after comminution, was soluble in aqueous solutions of ammonia, sodium hydroxide and other alkalis.

The processes of the present invention may also be carried out by incorporating in the mixture of monomers a retarder, that is, an agent which is capable of limiting the chain length of the copolymers. Such agents are not required as is illustrated by the processes described in Examples I to III, but may be used to further reduce the reaction rate of the polymerization reaction and to produce copolymers having still lower molecular weights. As examples of such retarders may be mentioned $\beta$ nitro styrene, 1,4-naphthoquinone, and the like. The following examples serve to illustrate how the processes of the present invention may be modified by the use of such retarders.

Example IV

A mixture of methyl half ester of maleic acid and maleic anhydride was first prepared as follows:

Forty-six parts of maleic anhydride and 2.47 parts of methanol were reacted by heating at 65° C. for 25 minutes. A 100% conversion of the methanol to methyl half ester was thus effected.

The resulting mixture was then stirred together with 51.5 parts of monomeric styrene and 0.03 part of 1,4 naphthoquinone and the whole was heated in an inert atmosphere of carbon dioxide at 60° C. until the polymerization reaction was initiated as evidenced by the liberation of heat, which required about 30 minutes. Thereafter a steady reaction rate was maintained by cooling the mass at 50° C. and maintaining this temperature for about 3 hours. The temperature of the mass was then gradually raised to 130° to 140° C. over a period of several hours and the temperature was finally raised to 150° C. for 2 hours to complete the reaction.

The resulting copolymer cooled to a hard mass which contained a low residual monomer content. The copolymer dissolved after comminution, in aqueous solutions of ammonia and sodium hydroxide.

The following example illustrates the use of a catalyst and retarder in the processes of the present invention.

Example V

Forty-six parts of maleic anhydride and 2.8 parts of methanol were admixed and reacted by warming at 60° to 70° C. for a few minutes and the reaction product including the methyl acid maleate obtained by practically 100% conversion of the methyl alcohol to the ester combined with 51 parts by weight of styrene, 0.05 part of di-tertiary-butyl peroxide and 0.15 part of beta-nitro styrene. It will be noted that the molar ratio of methanol to maleic anhydride employed in this example is 0.19 to 1. Polymerization was carried out in the presence of an inert atmosphere such as nitrogen, suitably by initiating the reaction at 65° C. which requires about 20 minutes with subsequent reduction of temperature to 45° C. during the bulk of the period of active production of heat of reaction which requires about 2 hours, followed by a gradual rise to a temperature of 125° C. for several hours to essentially complete the conversion to the polymer. In the above process, the di-tertiary-butyl peroxide serves as a catalyst and the $\beta$ nitro styrene serves as a retarder to reduce the reaction rate and the chain length of the copolymer. The methyl acid maleate not only reduces the reaction rate and molecular weight of the product, but more particularly prevents separation of polymer as a gel from the polymer-monomer mixture. The product after comminution is capable of dissolving in aqueous solution of alkaline materials such as ammonia, caustic soda and the like.

The solutions as prepared in the foregoing examples are useful as sizes, emulsifying agents, detergents, cements and in the preparation of pigmented finishes.

The product as prepared in the foregoing examples comprises a styrene-maleic anhydride polymer, which dissolves in alkali as the styrene-maleic acid salt. The methyl, ethyl or n-propyl acid ester replacing the anhydride, in part reverts to anhydride and free alcohol during the polymerization and in part persists in the copolymer, providing a copolymer characterized by the improved reaction properties described.

By the practice of this invention, mass polymerization of compounds possessing the structural formula of $R-CH=CH_2$ with ethylene $\alpha,\beta$ dicarboxylic acid compounds, may be effected efficiently to produce a uniform polymeric product.

While in the specific examples given above, methyl, ethyl and propyl acid maleate have been specifically shown in conjunction with maleic anhydride, the same half esters of other ethylene $\alpha,\beta$ dicarboxylic acids may be employed. Thus, in place of methyl, ethyl or propyl acid maleate there may be employed methyl, ethyl or propyl half esters of phenyl maleic, benzyl maleic, ethyl maleic, chlor maleic, citraconic and like acids. Instead of maleic anhydride, there may be employed the anhydrides of citraconic acid, phenyl maleic acid, benzyl maleic acid, ethyl maleic acid, chlor maleic acid and the like. Likewise, in place of styrene, there may be employed halogen substituted styrene, such as, for example, chlor styrene and methyl styrene and the like.

This invention, then, affords a practical process for the preparation of a polymer of vinyl compounds of the structural formula R—CH=CH$_2$ where R is a phenyl or substituted phenyl radical with ethylene $\alpha,\beta$ dicarboxylic acid anhydrides or the various possible polymer combinations with partial replacement of anhydride by an alkyl half ester of an ethylene $\alpha,\beta$ dicarboxylic acid in which the alkyl group contains from 1 to 3 carbon atoms. Generally in the process of this invention the anhydride has a stronger combining power for the vinyl compound than the half ester so that there is a tendency for high anhydride content in the first polymer formed and a low anhydride content in the last stages of reaction. When the methyl half ester of the ethylene $\alpha,\beta$ dicarboxylic acid, for example, methyl acid maleate is employed as the modifier in the preparation of styrene-maleic anhydride polymer there is the least difference between anhydride and ester in this respect so that the methyl ester is the preferred modifier in the class of acid maleates. Generally, at the ultimate high temperature of reaction methyl, ethyl or propyl half esters of the ethylene $\alpha,\beta$ dicarboxylic acids tend to convert to anhydride and vice versa so that inhomogeneity of the polymer is substantially corrected This application is a continuation-in-part of my co-pending application, Serial No. 719,135, filed December 28, 1946, now abandoned.

What is claimed is:

1. The process which comprises heating a mixture of a polymerizable vinyl compound having the structural formula R—CH=CH$_2$, where R is a member selected from the group consisting of phenyl and a substituted phenyl radical, with an ethylene $\alpha,\beta$ dicarboxylic anhydride in the presence of an alkyl half ester of an ethylene $\alpha,\beta$ dicarboxylic acid, in which the alkyl radical contains from 1 to 3 carbon atoms, until polymerization is initiated and exothermic reaction begins, cooling the resulting mass sufficiently to control the polymerization reaction during at least the major portion of the period of heat generation, and then heating the mass until the polymerization reaction is substantially complete, said vinyl compound and said dicarboxylic components being present in a molar ratio between 1:1 and 1.5:1, said dicarboxylic anhydride and said alkyl half ester being present in a molar ratio between 1:0.1 and 1:1.5.

2. The process which comprises heating a mixture of a polymerizable vinyl compound having the structural formula R—CH=CH$_2$, where R is a member selected from the group consisting of phenyl and a substituted phenyl radical, with an ethylene $\alpha,\beta$ dicarboxylic anhydride in the presence of an alkyl half ester of an ethylene $\alpha,\beta$ dicarboxylic acid corresponding to said anhydride, in which the alkyl group contains from 1 to 3 carbon atoms, until polymerization is initiated and exothermic reaction begins, cooling the resulting mass sufficiently to control the polymerization reaction during at least the major portion of the period of heat generation, and then heating the mass until the polymerization reaction is substantially complete, said vinyl compound and said dicarboxylic components being present in a molar ratio between 1:1 and 1.5:1, said dicarboxylic anhydride and said alkyl half ester being present in a molar ratio between 1:0.1 and 1:1.5.

3. The process according to claim 2, but further characterized in that styrene is the polymerizable vinyl compound.

4. The process which comprises heating a mixture of styrene with maleic anhydride in the presence of an alkyl half ester of maleic acid, in which the alkyl group contains from 1 to 3 carbon atoms, until polymerization is initiated and exothermic reaction begins, cooling the resulting mass sufficiently to control the polymerization reaction during at least the major portion of the period of heat generation, and then heating the mass until the polymerization reaction is substantially complete, said styrene and maleic components being present in a molar ratio between 1:1 and 1.2:1, said anhydride and said alkyl half ester being present in a molar ratio between 1:0.2 and 1:1.5.

5. The process according to claim 4, but further characterized in that methyl acid maleate is the alkyl half ester.

6. The process according to claim 4, but further characterized in that ethyl acid maleate is the alkyl half ester.

7. The process according to claim 4, but further characterized in that n-propyl acid maleate is the alkyl half ester.

8. The process according to claim 4, but further characterized in that the polymerization reaction is carried out in an inert atmosphere and in the presence of a polymerization catalyst, and a retarding agent selected from the group consisting of $\beta$ nitro styrene and 1,4 naphthoquinone.

9. The artificial resin obtained by the process of claim 1.

10. The artificial resin obtained by heating a mixture of styrene with maleic anhydride in the presence of methyl acid maleate until polymerization is initiated and exothermic reaction begins, cooling the resulting mass sufficiently to control the polymerization reaction during at least the major portion of the period of heat generation, and then heating the mass until the polymerization reaction is substantially complete, said styrene and maleic components being present in a molar ratio between 1:1 and 1.2:1, said anhydride and the methyl acid maleate being present in a molar ratio between 1:0.2 and 1:1.5.

11. The process which comprises heating a mixture of styrene with maleic anhydride in the presence of an alkyl half ester of maleic acid, in which the alkyl group contains from 1 to 3 carbon atoms, at a temperature of 40 to 70° C. until polymerization is initiated and exothermic reaction begins, thereafter maintaining the temperature of the resulting mass between about 30 and 60° C. for a period of 2 to 30 hours to control the polymerization reaction and then raising the temperature of said mass to 120 to 170° C. until the polymerization reaction is substantially complete, said styrene and maleic components being present in a molar ratio between 1:1 and 1.2:1, said anhydride and said alkyl half ester being present in a molar ratio between 1:0.2 and 1:1.5.

GERALD R. BARRETT.

No references cited.